United States Patent

Mutsuo et al.

(10) Patent No.: US 9,153,057 B2
(45) Date of Patent: *Oct. 6, 2015

(54) IMAGE PROCESSING APPARATUS THAT DETECTS AN ORDINARY CHARACTER AND A DENSITY REVERSED CHARACTER

(71) Applicant: KYOCERA Document Solutions Inc., Tamatsukuri, Chuo-ku, Osaka-shi, Osaka (JP)

(72) Inventors: Toshiaki Mutsuo, Osaka (JP); Masaki Baba, Osaka (JP)

(73) Assignee: Kyocera Document Solutions Inc. (JP)

( * ) Notice: Subject to any disclaimer, the term of this patent is extended or adjusted under 35 U.S.C. 154(b) by 44 days.

This patent is subject to a terminal disclaimer.

(21) Appl. No.: 14/086,304

(22) Filed: Nov. 21, 2013

(65) Prior Publication Data

US 2014/0146072 A1 May 29, 2014

(30) Foreign Application Priority Data

Nov. 27, 2012 (JP) ................................. 2012-258799

(51) Int. Cl.
| | |
|---|---|
| G06K 9/00 | (2006.01) |
| G06T 11/60 | (2006.01) |
| G09G 5/02 | (2006.01) |
| G06K 9/34 | (2006.01) |
| G06K 9/38 | (2006.01) |

(52) U.S. Cl.
CPC ................ *G06T 11/60* (2013.01); *G06K 9/342* (2013.01); *G06K 9/38* (2013.01); *G09G 5/02* (2013.01); *G06K 2209/01* (2013.01)

(58) Field of Classification Search
None
See application file for complete search history.

(56) References Cited

U.S. PATENT DOCUMENTS

| 6,259,734 B1* | 7/2001 | Boon ............................ 375/240 |
| 6,470,094 B1* | 10/2002 | Lienhart et al. ............... 382/176 |
| 6,813,040 B1* | 11/2004 | Uchino et al. ................. 358/1.9 |
| 7,280,599 B2* | 10/2007 | Karczewicz et al. .... 375/240.17 |
| 8,401,303 B2* | 3/2013 | Dai ............................... 382/195 |
| 8,509,530 B2* | 8/2013 | Matsuda ....................... 382/164 |
| 2002/0037100 A1* | 3/2002 | Toda et al. .................... 382/166 |
| 2003/0118234 A1* | 6/2003 | Tanaka et al. ................. 382/173 |
| 2004/0165782 A1 | 8/2004 | Misawa |
| 2007/0160295 A1 | 7/2007 | Wang et al. |
| 2009/0097765 A1* | 4/2009 | Kimura et al. ................ 382/243 |

(Continued)

FOREIGN PATENT DOCUMENTS

| JP | 2002-279345 | 9/2002 |
| JP | 2010-186246 | 8/2010 |

*Primary Examiner* — Bhavesh Mehta
*Assistant Examiner* — Feng Niu

(57) ABSTRACT

An edge image generating unit generates an edge image formed by edges in an original image. A connection pixel extracting unit extracts connection pixel sets in the edge image. A binary image generating unit classifies the connection pixel sets by colors and generates respective character images of the colors. A background image generating unit generates a background image of the original image. An image compressing unit compresses image data of the character images and the background image using different compressing methods. The binary image generating unit identifies which of a density reversed character, an ordinary character and non character each one of the connection pixel sets is, on the basis of luminance values of the original image on pixels at four corners of a rectangle circumscribed to the connection pixel set, and generates the character images of the density reversed character and the ordinary character.

4 Claims, 3 Drawing Sheets

(56) References Cited

U.S. PATENT DOCUMENTS

2014/0147036 A1* 5/2014 Mutsuo et al. ............... 382/164
2014/0147038 A1* 5/2014 Mutsuo et al. ............... 382/165
2014/0177958 A1* 6/2014 Mutsuo et al. ............... 382/166
2015/0003728 A1* 1/2015 Nanbu et al. ................. 382/165

* cited by examiner

IMAGE PROCESSING APPARATUS THAT DETECTS AN ORDINARY CHARACTER AND A DENSITY REVERSED CHARACTER

CROSS-REFERENCE TO RELATED APPLICATIONS

This application relates to and claims priority rights from a Japanese Patent Application No. 2012-258799, filed on Nov. 27, 2012, the entire disclosures of which are hereby incorporated by reference herein.

BACKGROUND

1. Field of the Present Disclosure

The present disclosure relates to an image processing apparatus.

2. Description of the Related Art

A technique detects an outline character in an original image. For example, an image processing apparatus extracts a white connection pixel set to detect an outline character differently from a black connection pixel set to detect an ordinary character in an original image, and detects an outline character on the basis of the white connection pixel set.

However, as mentioned, due to detecting a white connection pixel set, it takes a lot of time in order to detect a density reversed character such as an outline character and an ordinary character (i.e. a character which is not a density reversed character).

SUMMARY

An image processing apparatus according to an aspect of the present disclosure includes an edge image generating unit, a connection pixel extracting unit, a binary image generating unit, a background image generating unit, and an image compressing unit. The edge image generating unit is configured to detect edges in an original image and to generate an edge image formed by the detected edges. The connection pixel extracting unit is configured to extract connection pixel sets in the edge image. The binary image generating unit is configured to classify the connection pixel sets by colors and generate respective character images which are binary images corresponding to the colors. The background image generating unit is configured to generate a background image of the original image on the basis of the character images. The image compressing unit is configured to compress image data of the character images and image data of the background image using respective different compressing methods. The binary image generating unit is further configured (a) to identify which of a density reversed character, an ordinary character and non character each one of the connection pixel sets is, on the basis of luminance values of the original image on pixels at four corners of a rectangle circumscribed to the connection pixel set, and (b) to generate the character image of the density reversed character and the character image of the ordinary character.

Therefore, a density reversed character and an ordinary character are detected in a short time.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
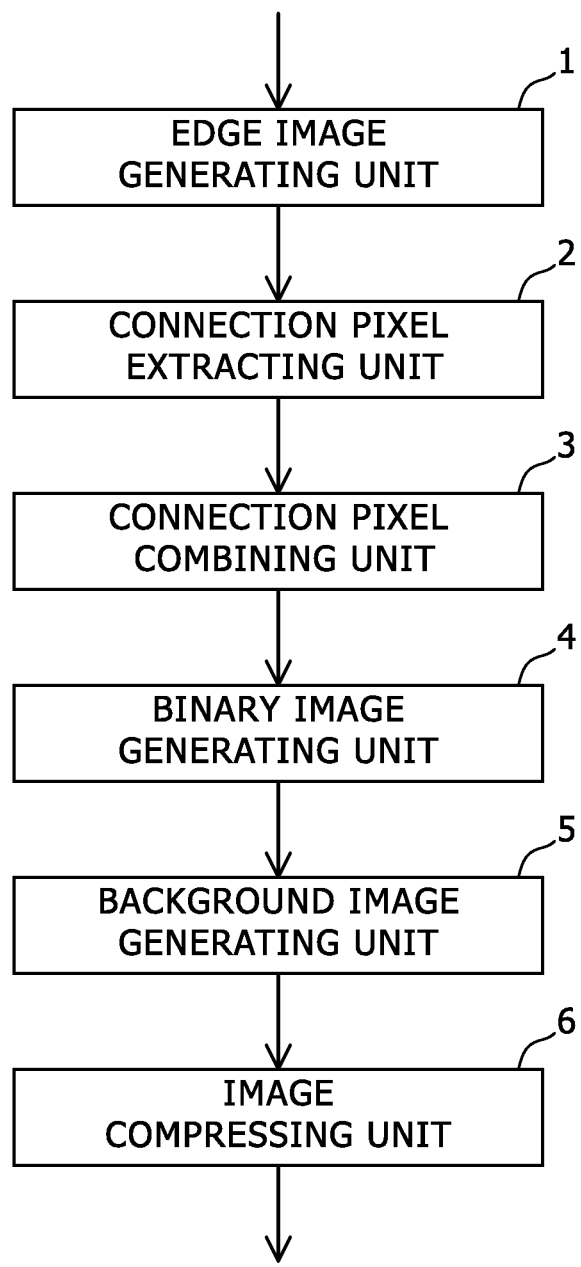
FIG. 1 shows a block diagram which indicates a configuration of an image processing apparatus according to an embodiment of the present disclosure.

FIG. 1 shows a block diagram which indicates a configuration of an image processing apparatus according to an embodiment of the present disclosure. The image processing apparatus shown in FIG. 1 is formed, for example, with an ASIC (Application Specific Integrated Circuit), a computer, and so forth. Image data of sorts of images such as an original image is stored in a RAM (Random Access Memory), a non volatile memory, or the like. The ASIC and a processor in the computer forms processing units mentioned below.

An edge image generating unit 1 detects edges in an original image, and generates an edge image formed by the detected edges. In this embodiment, the edge image is an image which indicates positions of pixels on a high density side of the detected edges, and a binary image. Therefore, values of the pixels on a high density side of the detected edges are 1, values of the other pixels are 0.

In this embodiment, the original image is a gradational color image, and the edge image generating unit 1 generates an image of only a luminance component of the original image, detects edges in the generated image, and generates the edge image formed by the detected edges.

A connection pixel extracting unit 2 extracts a connection pixel set in the edge image, and manages a series of connection pixels so as to enable them to be identified as a set. Therefore, when a connection pixel set and another connection pixel set are not connected, the connection pixel sets are managed so as to enable them to be identified as two different sets. A connection pixel set consists of either a single pixel or plural pixels which are concatenated to each other among the aforementioned pixels on the high density side (i.e. pixels with the pixel value of 1).

A connection pixel combining unit 3 detects the connection pixel sets to which the circumscribed rectangles are close to each other and groups the detected connection pixel sets as one connection pixel set. Therefore, if two connection pixel sets are grouped, then they are managed as one connection pixel set. For example, connection pixel sets are grouped if a predetermined condition is satisfied such as a condition that one of rectangles circumscribed to the connection pixel sets is overlapped to the other in a part or a condition that a distance between rectangles circumscribed to the connection pixel sets is shorter than a predetermined threshold value.

A binary image generating unit 4 classifies the connection pixel sets by colors of the connection pixel sets (i.e. colors in the original image) and generates respective character images corresponding to the colors. The character images are binary images. Here the character image is generated on the basis of connection pixel sets except for a connection pixel set which does not correspond to a character.

For example, regarding five connection pixel sets A to E, if connection pixel sets A and B in an original image have a first color, connection pixel set C in the original image has a second color (a different color from the first color), connection pixel sets D and E in an original image have a third color (a different color from the first and the second colors), then for the first color a character image is generated in which pixel values in positions of the connection pixel sets A and B are 1 and pixel values in the other positions are 0, for the second color a character image is generated in which pixel values in positions of the connection pixel set C are 1 and pixel values in the other positions are 0, and for the third color a character image is generated in which pixel values in positions of the connection pixel sets D and E are 1 and pixel values in the other positions are 0.

A background image generating unit 5 generates a background image of the original image on the basis of the aforementioned character images. Specifically, the background image generating unit 5 identifies positions of characters in the aforementioned character image (i.e. pixel positions in which pixel values are 1) on the basis of the character image, and generates a background image by changing pixel values of original image in the identified positions in the following manner.

The background image generating unit 5 generates the background image by changing pixel values in a position of the character image (i.e. positions of pixels with the pixel value of 1 in the character image) in the original image to an average value of pixel values of the original image on at least a part of the rectangle.

Figure 2A:
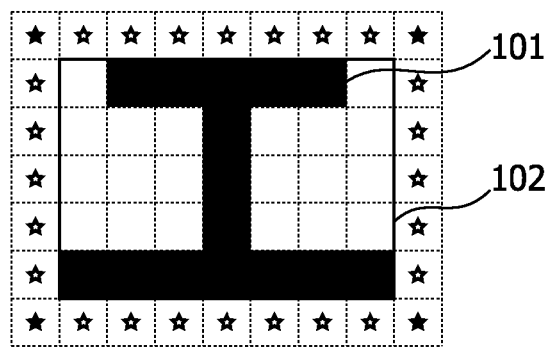
FIGS. 2A to 2C show diagrams which indicate examples of connection pixel sets extracted in the image processing apparatus shown in FIG. 1.
Figure 2B:
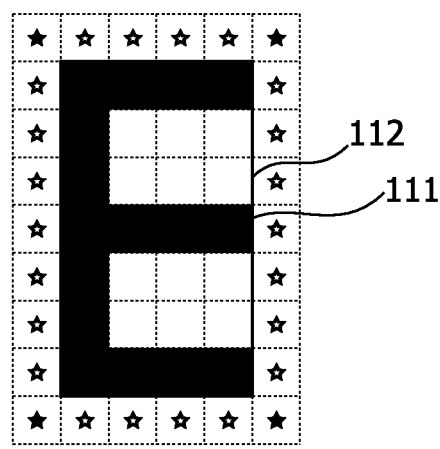
Figure 2C:
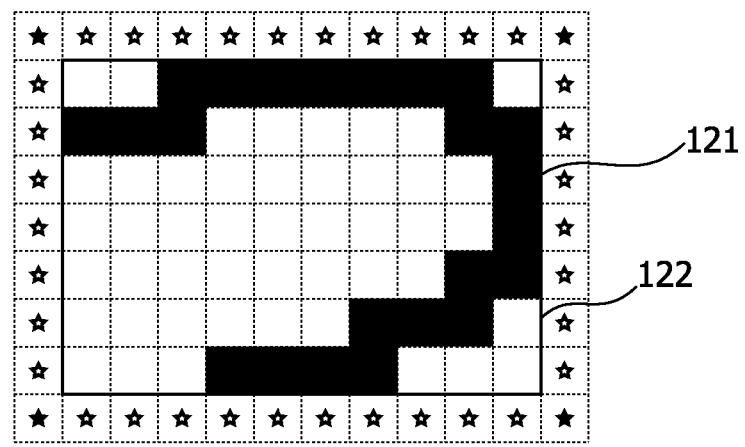

FIGS. 2A to 2C show diagrams which indicate examples of connection pixel sets extracted in the image processing apparatus shown in FIG. 1.

In an example shown in FIG. 2A, the original image includes a Japanese character. In this example, a connection pixel set 101 is detected, and a rectangle 102 circumscribed to the connection pixel set 101 is identified. In this example, on the basis of pixel values of the original image on pixels with star marks around the rectangle 102, pixel values of the background image in positions of this connection pixel set 101 are determined.

In an example shown in FIG. 2B, the original image includes a character "E". In this example, a connection pixel set 111 is detected, and a rectangle 112 circumscribed to the connection pixel set 111 is identified. In this example, on the basis of pixel values of the original image on pixels with star marks around the rectangle 112, pixel values of the background image in positions of this connection pixel set 111 are determined.

In an example shown in FIG. 2C, the original image includes another Japanese character. In this example, a connection pixel set 121 is detected, and a rectangle 122 circumscribed to the connection pixel set 121 is identified. In this example, on the basis of pixel values of the original image on pixels with star marks around the rectangle 122, pixel values of the background image in positions of this connection pixel set 121 are determined.

It should be noted that the background image generating unit 5 may generate the background image by changing pixel values in a position of the character image in the original image to an average value of pixel values of the original image on all of surrounding pixels of the aforementioned rectangle.

Further, the background image generating unit 5 may generate the background image by changing pixel values in a position of the character image in the original image to an average value of pixel values of the original image on four pixels (pixels with black star marks in FIGS. 2A to 2C) positioned at four corners among surrounding pixels of the aforementioned rectangle.

If there are groups of connection pixel sets, then the binary image generating unit 4 classifies the groups of connection pixel sets by colors of the group of connection pixel sets, and generates character images corresponding to the colors. In this process, if a color of a group of connection pixel sets is identical to a color of another ungrouped connection pixel set, then the group and the ungrouped connection pixel set are included in a same character image. In addition, for the grouped connection pixel sets, the background image generating unit 5 generates the background image by changing pixel values in a position of the character image in the original image to an average value of pixel values of the original image on at least a part of surrounding pixels of a rectangle circumscribed to the whole grouped connection pixel sets.

An image compressing unit 6 compresses image data of the aforementioned character images and image data of the background image using respective different compressing methods. For example, image data of the character image is compressed using MMR (Modified Modified READ) method, and image data of the background image is compressed using JPEG (Joint Photographic Experts Group) method. It should be noted that there are pieces of data of which the number is same as the number of the colors, and respective ones of the pieces of data are compressed. Further, a value of each color is managed so as to be related to compressed image data of that color.

In the following part, a behavior of the aforementioned image processing apparatus is explained.

Firstly, the edge image generating unit 1 detects edges in an original image and generates an edge image formed by the detected edges.

Subsequently, the connection pixel extracting unit 2 extracts a connection pixel set in the edge image, and manages a series of connection pixels so as to enable them to be identified as one set.

The connection pixel combining unit 3 identifies positions and sizes of respective rectangles circumscribed to the connection pixel sets extracted by the connection pixel extracting unit 2, detects the connection pixel sets to which the circumscribed rectangles are close to each other and groups the detected connection pixel sets as one connection pixel set if the circumscribed rectangles are close to each other.

Subsequently, the binary image generating unit 4 classifies the connection pixel sets by colors of the connection pixel sets (i.e. colors in the original image) and generates respective character images corresponding to the colors.

In the aforementioned manner, respective color images of colors are generated.

Subsequently, the background image generating unit 5 generates a background image of the original image on the basis of the aforementioned character images. As mentioned, the background image generating unit 5 generates the background image by changing pixel values in a position of the character image in the original image to an average value of pixel values of the original image on at least a part of surrounding pixels of the rectangle.

In the aforementioned manner, a background image is generated.

The image compressing unit 6 compresses image data of the aforementioned character images and image data of the background image using respective different compressing methods.

In the aforementioned manner, character images and a background image are separated from an original image and are compressed separately.

It should be noted that the image processing apparatus of the aforementioned embodiment detects a connection pixel set corresponding to a density reversed character (i.e. a character with a density lower than its background) such as an outline character in the following manner. The binary image generating unit 4 identifies which of an ordinary character (i.e. a character other than a density reversed character), a density reversed character and non character each one of the connection pixel sets (including the aforementioned group) is, on the basis of luminance values of the original image on pixels at four corners of a rectangle circumscribed to the connection pixel set.

In this embodiment, the binary image generating unit 4 identifies that the connection pixel set (including the aforementioned group) is an ordinary character if all of the luminance values are larger than the binarization threshold value, identifies that the connection pixel set is a density reversed character if all of the luminance values are less than a predetermined binarization threshold value, and otherwise identifies that the connection pixel set is non character.

In a case of a density reversed character, as well as a case of an ordinary character, as mentioned in this embodiment, respective character images are generated corresponding to colors of density reversed characters. Consequently, for a density reversed character and an ordinary character a character image is generated, but for non character a character image is not generated.

Figure 3A:
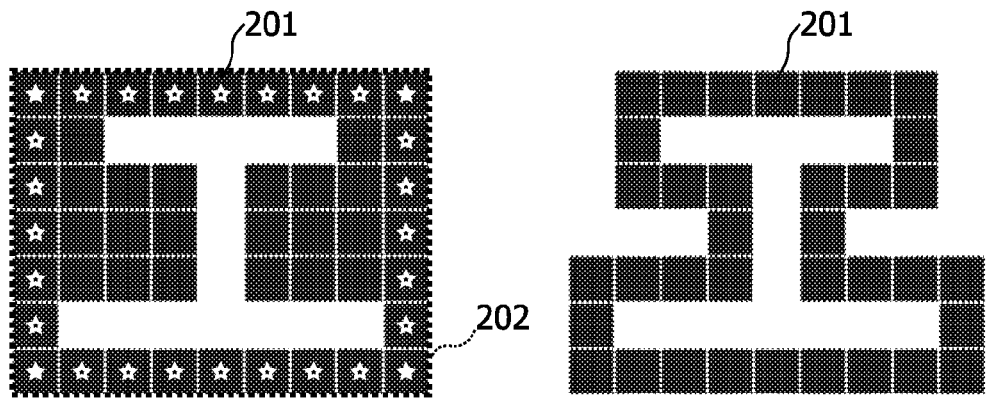
FIGS. 3A to 3C show diagrams which indicate other examples of connection pixel sets extracted in the image processing apparatus shown in FIG. 1.
Figure 3B:
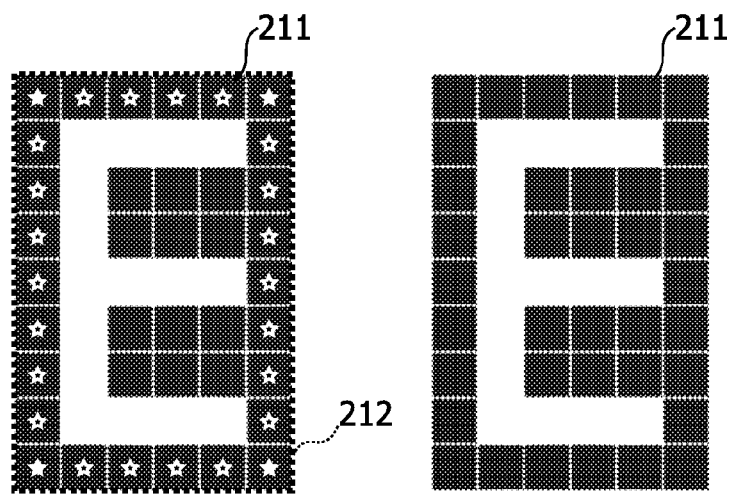
Figure 3C:
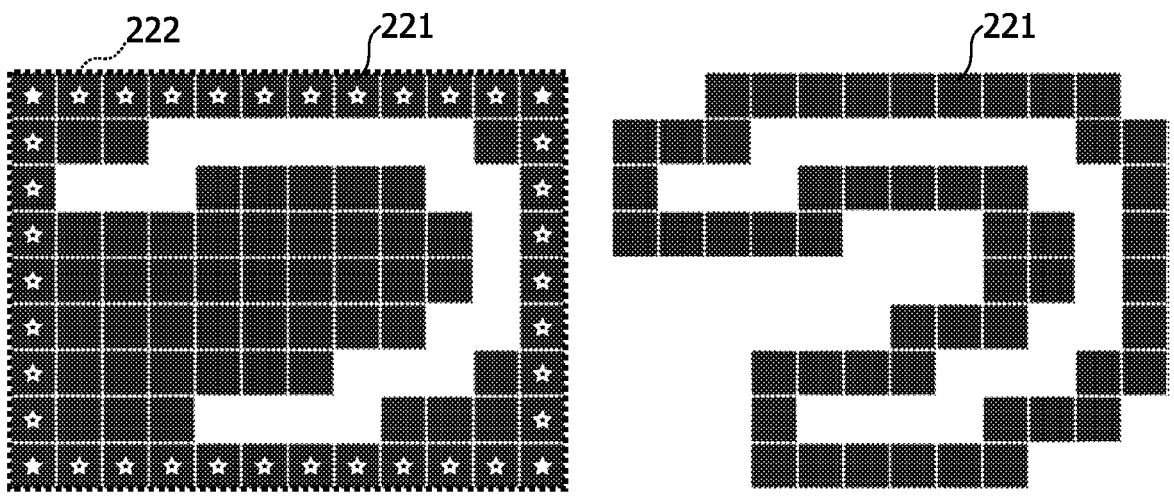

FIGS. 3A to 3C show diagrams which indicate other examples of connection pixel sets extracted in the image processing apparatus shown in FIG. 1.

In an example shown in FIG. 3A, the original image includes an outline character as a Japanese character. In this example, a connection pixel set 201 is detected, and a rectangle 202 circumscribed to the connection pixel set 201 is identified. This connection pixel set 201 is identified as an outline character on the basis of luminance values of an original image on pixels (pixels with white star marks) at four corner of the rectangle 202.

In an example shown in FIG. 3B, the original image includes an outline character of "E". In this example, a connection pixel set 211 is detected, and a rectangle 212 circumscribed to the connection pixel set 211 is identified. This connection pixel set 211 is identified as an outline character on the basis of luminance values of an original image on pixels (pixels with white star marks) at four corner of the rectangle 212.

In an example shown in FIG. 3C, the original image includes an outline character as another Japanese character. In this example, a connection pixel set 221 is detected, and a rectangle 222 circumscribed to the connection pixel set 221 is identified. This connection pixel set 221 is identified as an outline character on the basis of luminance values of an original image on pixels (pixels with white star marks) at four corner of the rectangle 222.

In the aforementioned embodiment, the edge image generating unit 1 detects edges in an original image and generates an edge image formed by the detected edges. The connection pixel extracting unit 2 extracts connection pixel sets in the edge image. The binary image generating unit 4 classifies the connection pixel sets by colors and generates respective character images which are binary images corresponding to the colors. The background image generating unit 5 generates a background image of the original image on the basis of the character images. The image compressing unit 6 compresses image data of the character images and image data of the background image using respective different compressing methods. Further the binary image generating unit 4 (a) identifies which of a density reversed character, an ordinary character and non character each one of the connection pixel sets is, on the basis of luminance values of the original image on pixels at four corners of a rectangle circumscribed to the connection pixel set, and (b) generates the character image of the density reversed character and the character image of the ordinary character.

In this manner, only a connection pixel set of a pixel with a dot is extracted without extracting a connection pixel set of a pixel with no dot, and consequently a density reversed character and an ordinary character are detected. Therefore, a density reversed character and an ordinary character are in an original image are detected in a short time.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
an edge image generating unit configured to detect edges in an original image and to generate an edge image formed by the detected edges;
a connection pixel extracting unit configured to extract connection pixel sets in the edge image;
a binary image generating unit configured to classify the connection pixel sets by colors and generate respective character images which are binary images corresponding to the colors;
a background image generating unit configured to generate a background image of the original image on the basis of the character images; and
an image compressing unit configured to compress image data of the character images and image data of the background image using respective different compressing methods;
wherein the binary image generating unit is further configured (a) to identify which of a density reversed character, an ordinary character and non character each one of the connection pixel sets is, on the basis of luminance values of the original image on pixels at four corners of a rectangle circumscribed to the connection pixel set, and (b) to generate the character image of the density reversed character and the character image of the ordinary character;
wherein the binary image generating unit is further configured (a) to identify that the connection pixel set is a density reversed character if all of the luminance values are less than a predetermined binarization threshold value, (b) to identify that the connection pixel set is an ordinary character if all of the luminance values are larger than the binarization threshold value, and (c) to identify that the connection pixel set is non character if at least one of the luminance values are larger than the binarization threshold value and at least one of the luminance values are less than the binarization threshold value.

2. The image processing apparatus according to claim 1, further comprising a connection pixel combining unit configured to detect the connection pixel sets to which the circumscribed rectangles are close to each other and to group the detected connection pixel sets as one connection pixel set;
wherein for the grouped connection pixel sets, the binary image generating unit is further configured to identify which of a density reversed character, an ordinary character and non character each one of the grouped connection pixel sets is, on the basis of luminance values of the original image on pixels at four corners of a rectangle circumscribed to the grouped connection pixel sets.

3. The image processing apparatus according to claim 1, wherein the background image generating unit is further configured to generate the background image by changing pixel values in a position of the character image in the original image to an average value of pixel values of the original image on at least a part of surrounding pixels of the rectangle.

4. The image processing apparatus according to claim 1, wherein the original image is a gradational color image; and the edge image generating unit is further configured (a) to generate an image of only a luminance component of the original image, (b) to detect edges in the generated image, and (c) to generate the edge image formed by the detected edges.

* * * * *